United States Patent

Blondelet et al.

[11] Patent Number: 6,074,016
[45] Date of Patent: Jun. 13, 2000

[54] FLEXIBLE AXLE EMBODYING A CROSSPIECE AND TRAILING ARMS

[75] Inventors: Michel Blondelet, Le Crest; Jacques Foulquier, Cébazat, both of France

[73] Assignee: Compagnie Générale des Etablissements Michelin—Michelin & Cie, Clermont-Ferrand Cedex, France

[21] Appl. No.: 09/209,672

[22] Filed: Dec. 10, 1998

Related U.S. Application Data

[63] Continuation of application No. PCT/EP97/02945, Jun. 6, 1997.

[30] Foreign Application Priority Data

Jun. 14, 1996 [FR] France .................................. 96 07517

[51] Int. Cl.⁷ .................................................. B60B 35/06
[52] U.S. Cl. .................................... 301/127; 280/124.128
[58] Field of Search ................................ 301/124.1, 127; 280/124.13, 124.128, 124.166, 124.169

[56] References Cited

U.S. PATENT DOCUMENTS

| | | | |
|---|---|---|---|
| 3,171,642 | 3/1965 | Allison | 280/124.128 |
| 3,332,702 | 7/1967 | Rosenkrands | 280/124.128 X |
| 3,601,426 | 8/1971 | Hury . | |
| 3,615,103 | 10/1971 | Döhring et al. . | |
| 3,778,082 | 12/1973 | Grosseau . | |
| 4,234,205 | 11/1980 | Thiesce . | |
| 4,392,667 | 7/1983 | Shakespear | 280/124.128 X |
| 4,491,342 | 1/1985 | Aubry . | |
| 4,787,680 | 11/1988 | Bonjean et al. | 301/127 X |

FOREIGN PATENT DOCUMENTS

| | | |
|---|---|---|
| 0114790 | 8/1984 | European Pat. Off. . |
| 2523522 | 9/1983 | France . |
| 2523523 | 9/1983 | France . |
| 2544259 | 10/1984 | France . |
| 2608517 | 6/1988 | France . |
| 2618733 | 2/1989 | France . |
| 2645802 | 10/1990 | France . |
| 1580358 | 1/1970 | Germany . |
| 3818412 | 12/1988 | Germany . |
| 4445995 | 4/1996 | Germany . |
| 2041845 | 9/1980 | United Kingdom . |
| 2154965 | 9/1985 | United Kingdom . |

Primary Examiner—Russell D. Stormer
Attorney, Agent, or Firm—Baker & Botts, L.L.P.

[57] ABSTRACT

An axle comprises having a crossmember coupling two arms, each arm carrying a stub axle for receiving a wheel, the crossmember being formed essentially by two coaxial half-crossmembers partially inserted into each other. Resilient rings non-slidingly integral with each of the half-crossmembers and axially spaced from each other ensure the relative torsional stress transmission between the half-crossmembers. The crossmember is not aligned with the pivot axis of the arms on the body.

5 Claims, 2 Drawing Sheets

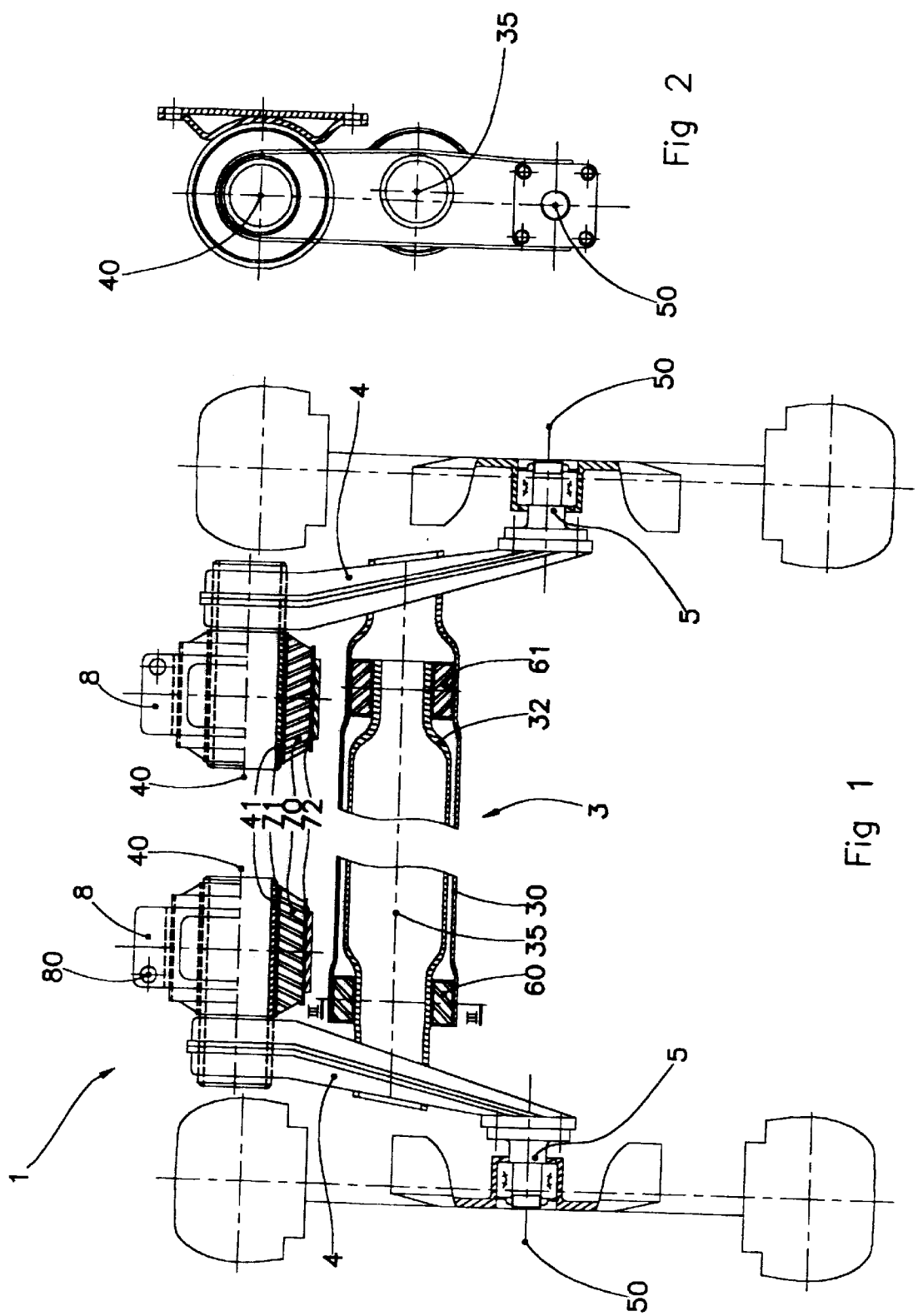

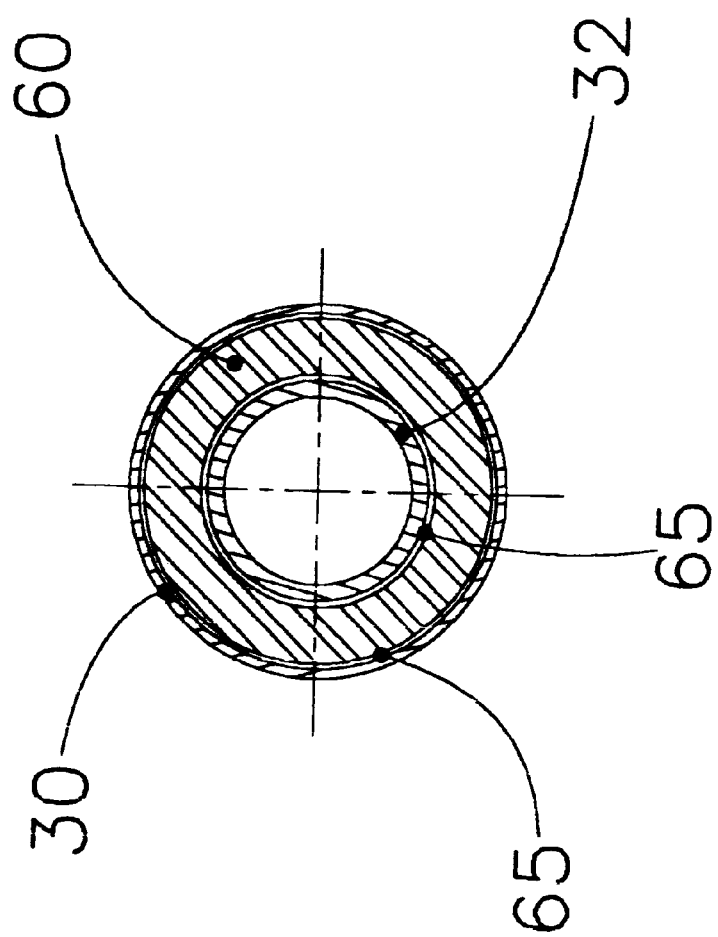

FLEXIBLE AXLE EMBODYING A CROSSPIECE AND TRAILING ARMS

This is a continuation of PCT/EP97/02945, filed Jun. 6, 1997.

BACKGROUND OF THE INVENTION

The invention concerns the suspension of motor vehicles. In particular, the invention relates to an axle connecting two wheels, while containing an antiroll function. More specifically, the invention pertains to the category of axles which have two suspension arms, one end of which supports a stub axle receiving a wheel, while the other end is pivotally mounted on the body of the vehicle, and which axle further has a crossmember connecting the two suspension arms.

Several variants of these axles are known and distinguished according to the exact position of the crossmember relative to the arms. This crossmember is sometimes mounted on the body, other times it is mounted in an intermediate position between the axis of the stub axles and the arm pivot axis on the body (see, for example, patent application EP 0,114,790), and still other times it is mounted in the axis of the stub axles, or it is mounted slightly beyond the stub axles, either crossing or not crossing a line intersecting the stub axle axis and the pivot axis, by reason of stresses associated with the space available or by reason of other criteria. This type of axle is commonly found at the rear of passenger cars.

Not considered here are independent wheel suspensions, which sometimes present in their trailing arm variants a sort of perfectly rigid crosspiece, that is, indeformable under the effect of the working stresses. Such a crossmember is placed in the arm pivot axis on the body, and the arms are mounted rotating on the crossmember. Patent application FR 2,393, 690 shows an independent wheel axle of this type. The crossmember of such an axle does not enter into the antiroll characteristics of the suspension, as the axle in question cannot be described as flexible.

The invention concerns flexible axles, that is, elastically deformable, in which the deformation or, in general, the stress of the crossmember enters into the antiroll stiffness characteristics of the wheel assembly concerned. In that case, the crossmember, taken as a whole, undergoes a relative rotation of its axial ends on a transverse axis. Patent FR 1,591,438 shows such an axle.

Such a crossmember is dimensioned to be very stiff in flexure. It helps maintain the wheel firmly when the suspension arm in turn undergoes bending stress in a plane containing the wheel arm and the crossmember. Such stresses are due to the transverse gripping of the road by the tire and can become very great on turns negotiated at high speed. In other words, the crossmember helps minimize the difficulty of steering of the wheel, or at least helps to control steering of the wheel, so that it remains within acceptable limits, or so that it can be controlled. In that case, the crosspiece often presents a very high characteristic torsional rigidity.

This is why it has previously been proposed that such crossmember be rendered less stiff in torsion while maintaining its flexural strength at a high level. U.S. Pat. No. 4,787,680 can be consulted in that connection. Unfortunately, such a conception offers sufficient torsion flexibility only when a sufficient length is available to establish the specific zone of the crossmember whose section is suited to reducing the torsional rigidity. In practice, that seems difficult to accomplish except in very heavy vehicles. In fact, the installation of suspension arms having their pivots on the body requires a transverse space practically independent of the size of the vehicle. Therefore, the space available for said specific zone diminishes with the wheel gauge of the vehicle at a rate much greater than proportionally. In other very common applications, the crossmember is formed by an open profile, the torsional rigidity of which is therefore much weaker. One finds, however, that the coupling of such a crossmember to the arms poses numerous problems of endurance. The zone of coupling is the site of a strong stress concentration, which leads to reinforcing it, for example, by welding additional coupling plates.

This is why steering of the wheels (geometric aspect) and control of the body movements (flexibility aspect, clearance of wheels as a function of transfers of loads) are treated separately. An antiroll bar separate from the steering components of the wheel or wheels very commonly gives the axle a roll resistance, added to that coming from the suspension springs through which the load of the vehicle is transmitted to the vehicle.

It is observed in the present state of the art that the choice between independent wheels and flexible axle presents some difficult problems which require compromises in features that are difficult to resolve.

If it is decided to adopt a wheel assembly of the type with flexible axle rather than independent wheels, the design of such axle must satisfy some rather conflicting imperatives. It is necessary to provide sufficient flexural strength for the axle, a guarantee of good maintenance of the wheel surface planes, avoiding excessive steering or steering in an undesired direction due to severe transverse stress. But it is necessary at the same time for the wheel arms to be able to clear each other relatively independently, while preferably having an elastic return to the position where the arms are parallel to each other. That is the antiroll function characteristic of the axle, as mentioned above.

SUMMARY OF THE INVENTION

The objective of this invention is to reconcile conflicting requirements better by giving the axle considerable flexural strength, while imparting to it a characteristic antiroll function, the level of which can be adjusted as freely as possible, in particular, so as to make possible more readily the use of such an axle on a very wide range of vehicles. In particular, the invention is intended to render the use of an antiroll bar superfluous, while imparting an antiroll function independent of that provided by the suspension elements of each of the wheels of an assembly.

One objective is to make it possible to integrate the roll control function of the vehicle easily. The invention is aimed at making possible, notably, the adoption of a crossmember imparting a characteristic antiroll function to the axle, like that of the axle proposed in the aforesaid U.S. Pat. No. 4,787,680.

Another objective of the invention is provide an axle that is as simple as possible to make in order to reduce its manufacturing cost.

A further objective of the invention is to provide corrections of wheel steering and/or camber, helping the vehicle to grip the road when it takes the roll on turns.

Finally, in a working variant, another objective is to enable the suspension function of the vehicle to be integrated, in particular so as to make mounting of the axle on the vehicle as simple as possible.

The invention proposes a flexible axle for a vehicle containing at least two axles and a suspended body, said axle comprising two trailing arms and a crossmember to which said arms are connected, said arms being designed to be coupled to the body so as to define a pivot axis for each arm on the body, said arms each bearing a stub axle designed to receive a wheel, the said crossmember connecting said arms so that they define a torsional axis on which the arms swing relative to each other, the torsional axis being offset from the pivot axis of each arm relative to the body, characterized in that the crossmember and the arms are coupled to each other by connecting means comprising elastomeric coupling pieces joining the coupled elements, non-slidingly integral with the latter and substantially arranged to be transversely symmetrical, each coupling piece having a predetermined transverse stiffness, said coupling pieces being arranged so that:

they allow a relative transverse displacement between coupled elements;

all of the reaction torque balancing the relative displacement between arms caused by torsion of the axle will be transmitted by the coupling pieces;

the coupling pieces are axially separated from one another.

Let us note that a direction parallel to the width of the vehicle, that is, parallel to the large dimension of the crossmember, is understood herein as "axial or axially or transversely." In the present application, "roll axis" describes an axis characteristic of the axle, on which the suspension arms present the relative clearance specific to a stress on the roll of the vehicle or, in general, specific to a nonidentical stress of the suspension arms, for example, when a single wheel crosses an obstacle in a straight line and not a reference axis for the body of the vehicle.

In the example illustrating this invention, the degree of freedom of torsion is provided by the elastic deformation of rubber coupling pieces, the torsional strength originating from the stiffness of said rubber coupling pieces, the other pieces constituting the crossmember being comparable to indeformable pieces.

One advantage of the invention lies in the fact that it allows wide angles of clearance of one arm from another. Therefore, on a given course of suspension movement of the wheels relative to the body of a vehicle, the suspension arms can be very short, much shorter than what is commonly found in the case of flexible axles. The same arm length as encountered in suspensions with independent wheels and trailing arms can generally be adopted.

In a preferred variant, compatible, of course, with the two means of implementation explained above, springs of elastomeric material for the suspension of the vehicle are integrated with the axle.

The invention will be better understood from the specification that follows of two variants of a rear axle for passenger cars. Those examples are nonlimitative and are illustrated in the accompanying drawings.

DESCRIPTION OF THE DRAWINGS

FIG. 1 is a plan view of an axle embodying the invention;

FIG. 2 is a side view;

FIG. 3 is a section along III—III of FIG. 1.

DESCRIPTION OF PREFERRED EMBODIMENTS

By viewing FIGS. 1 and 2 alongside each other, an axle 1 can be seen, designed to be mounted on the body of a vehicle by means of supports 8 embodying four points 80 of fastening to the body. The axle 1 contains a crossmember 3, connecting two suspension arms 4. Each suspension arm 4 is connected to a shaft 41 which defines a pivot axis 40 (that is, an axis of the arm 4 offset in relation to the body). The suspension arms 4 carry a stub axle 5 on the side opposite the arm anchorage shaft 41. Each stub axle 5 is intended to receive a wheel.

Resilient suspension joints 70, consisting here of rubber rings, surround the two shafts 41 on which they are mounted without possible relative rotation. The same resilient joints 70 are, furthermore, mounted on the supports 8, also without possible relative rotation. The resilient joints 70 thus form torsional springs, through which a part of the weight of the vehicle can be transmitted.

A particularly advantageous embodiment of the rubber rings constituting the resilient joints 70 is represented in FIG. 1. The radial section shape of said joints 70 has the general appearance of a trapezoid. The width of the radially interior face of each resilient joint 70, in contact with the inner ring 71, is greater than the width of the radially exterior face in contact with the outer ring 72. On at least the greater part of the thickness of said joint, the surface of each cylindrical section is preferably appreciably constant, whatever the radius of said cylindrical section. In other words, the product of the radius by the width is appreciably constant, whatever the radius, at least outside the zones of connection of the inner and outer rings.

The axle illustrated on the different figures contains a crossmember 3 which imparts an antiroll function. In FIG. 1, it can be seen that the crossmember 3 consists essentially of two half-crossmembers inserted into one another. One of those half-crossmembers consists of a first tube 30. The other half-crossmember consists of a coaxial second tube 32, the outer diameter of which is less than the inner diameter of the first tube 30. The two coupled elements in the form of half-crossmembers inserted into one another form a nested part which with two elastomeric coupling pieces 60, 61, flexibly connects the two half-crossmembers. Each of the tubes 30, 32 is directly flush-mounted on an arm 4, to which it is, for example, welded. There is then no possible displacement of a tube 30 or 32 relative to the corresponding arm 4.

The coupling pieces 60 and 61 consist here of rotary rubber rings affixed to metal collars 65 (FIG. 3), for example, at the time of vulcanization of the rubber rings. The collars 65 are hooped or stuck on the tubes 30 and 32. The two half-crossmembers are thus coupled in torsion, with possible angular displacement from each other, as a function of the stress and cumulative torsional rigidity presented by the rings 60 and 61. All of the reaction torque balancing the relative displacement between arms caused by torsion of the axle passes through the coupling pieces and is distributed between them.

By reason of the coupling pieces 60, 61, a relative transverse displacement between tubes 30 and 32 is possible. Test findings show that it is very slight But, however slight, it helps greatly improve the endurance of connection of the tubes 30 and 32 to their respective arms 4 because of the considerable reduction of transversely oriented stresses. This results in an improvement of stability of the flush mounting of the crossmember 3 on the arm 4, by comparison with the usual solutions for crossmembers offset from the pivot axis 40 of the axle on the body.

The longitudinal displacement can be observed in FIG. 1. It makes possible a correction of camber on torsional stresses of the axle on the torsional axis 35. The wheel plane is inclined toward the inside of the turn. Vertical displacement relative to the plane comprising the pivot axis 40 and axis of rotation of the wheels or stub axle axis 50 is very clearly observed in FIG. 2. A deflection in the direction indicated in the figure makes possible a correction of steering on torsional stresses of the axle on the torsional axis 35. The wheel plane steers toward the inside of the turn.

The axle provides all the functions usually offered by antiroll bars and suspension springs. It is possibly sufficient to add shock absorbers, not represented, for they can be of standard type and installation. The hysteretic losses of the rubber of the resilient joints 70 can, however, be sufficient for shock absorption or at least widely contribute to it. Thanks to the vibration filtering properties contributed by the use of rubber, it may no longer be necessary to use rubber filtering blocks, the resilient suspension joints 70 also playing that role. Owing to the fact that, on dimensioning of the axle, it is easy to separate the bearings 60 and 61 from each other, that relative cramping control, important for performance of a high-quality vehicle, is provided under excellent conditions. The axle can be very easily declined in different variants of different gauges for different versions of the same vehicle: for mounting of the axle, it is sufficient more or less to insert the tubes 30 and 32 into each other in order to obtain different spacings between the arms 4. A suitable positioning of the resilient joints 70 on the axes 40 makes it possible always to respect the same spacing dimension between the supports in order to mount the axle on a given body.

The use of rubber makes it possible to design nonlinear springs and to integrate clearance stop functions in the same elements 70 and possibly in bearings 60 and 61. All frictions (outside of those characteristic of the shock absorbers possibly present) are eliminated. It also makes it possible to adopt wide manufacturing tolerances for mechanical parts like tubes 30 or 32 or for the shafts 41 and supports 8. Furthermore, in contrast to the use of bearings, the use of rubber eliminates problems of lubrication and tightness. It is possible to take into account the creep due to static stresses through a judicious adjustment upon assembly, for almost all the creep occurs in the first hours of stress.

In order to make the tubes 30, 32, it is possible to use a composite material containing a resin filled with reinforcing fibers. This type of material offers the advantage of greater lightness.

The invention is particularly applicable as a rear assembly of a small passenger car. But it can have wider applications in any category of vehicle, for the torsion characteristics sought and the wheel plane steering precision can be selectively or separately adjusted.

We claim:

1. A flexible axle for a vehicle having at least two axles and a suspended body, said axle comprising two trailing arms, a crossmember connecting said arms, said arms being designed to be coupled to the body so as to provide a pivot axis for each arm on the body, said arms each carrying a stub axle designed to receive a wheel, the said crossmember connecting said arms defining a torsional axis on which the arms swing relative to each other, the torsional axis being set off from the pivot axis of each arm on the body, said crossmember comprising coupled elements, one coupled element connected to one arm and another coupled element connected to the other arm, and elastomeric couplings joining the coupled elements so as to be non-slidingly integral with the coupled elements and to maintain them transversely symmetrical, each coupling having a torsional stiffness on the torsional axis, said couplings being arranged in such a manner that:

they allow a relative transverse displacement between coupled elements;

all of the reaction torque balancing the relative displacement between arms caused by torsion of the axle will be transmitted by the couplings;

the couplings are axially separated from one another.

2. An axle according to claim 1, in which the coupled elements are formed essentially by two half-crossmembers partially inserted into one another, the said couplings connecting the half-crossmembers and being situated at the axially opposite ends of said inserted part, each of the half-crossmembers being respectively mounted on one of the arms.

3. An axle according to claim 2, in which the inserted part comprises a first tube containing a second tube, the outer diameter of the second tube being less than the inner diameter of the first tube at every point transversely, said couplings being rotary pieces.

4. An axle according to claim 1, in which each arm comprises a shaft located on the pivot axis of rotation relative to the body, said axle further containing supports receiving said shafts, each support having a reference surface for mounting on the said body, a resilient suspension joint between each support and the corresponding shaft, said resilient joint being non-slidingly integral with both said support and said shaft.

5. An axle according to claim 4, in which each shaft and each support each has a cylindrical bearing, the said resilient joint being inserted between said bearings, said resilient bearing being a rotary piece subjected to torsional stress by relative rotation of said bearings on clearance of the suspension.

* * * * *